US012218890B2

(12) United States Patent
Abraham et al.

(10) Patent No.: US 12,218,890 B2
(45) Date of Patent: Feb. 4, 2025

(54) COPILOT FOR MULTI-USER, MULTI-STEP COLLABORATIONS

(71) Applicant: Microsoft Technology Licensing, LLC, Redmond, WA (US)

(72) Inventors: Robin Abraham, Redmond, WA (US); Liang Du, Redmond, WA (US); Manqing Mao, Kenmore, WA (US); Paishun Ting, Kirkland, WA (US); Julia Chen, Bellevue, WA (US); Jianzhe Lin, Bellevue, WA (US); Yijian Xiang, Redmond, WA (US); Mingyang Xu, Kenmore, WA (US); Wenhan Wang, Bellevue, WA (US); Fahimeh Raja, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/490,236

(22) Filed: Oct. 19, 2023

(65) Prior Publication Data
US 2024/0430216 A1  Dec. 26, 2024

Related U.S. Application Data

(60) Provisional application No. 63/522,500, filed on Jun. 22, 2023.

(51) Int. Cl.
*H04L 51/02* (2022.01)
*H04L 51/216* (2022.01)

(52) U.S. Cl.
CPC ............ *H04L 51/02* (2013.01); *H04L 51/216* (2022.05)

(58) Field of Classification Search
CPC .............................. H04L 51/02; H04L 51/216
See application file for complete search history.

(56) References Cited

U.S. PATENT DOCUMENTS

| 11,159,470 | B1 * | 10/2021 | Botwick | ................ | H04L 51/212 |
| 11,949,638 | B1 * | 4/2024 | Rosenberg | .............. | H04L 51/04 |
| 2006/0168315 | A1 * | 7/2006 | Daniell | ................ | G06Q 10/107 |
| | | | | | 709/230 |

(Continued)

FOREIGN PATENT DOCUMENTS

| CN | 112399005 A | * | 2/2021 | ............. H04L 51/04 |
| CN | 117136405 A | * | 11/2023 | ............. G06F 40/35 |
| WO | WO-2019177485 A1 | * | 9/2019 | ....... G06F 16/90324 |

OTHER PUBLICATIONS

Ben Dickson, "GitHub Copilot is among the first real products based on large language models," Jul. 5, 2022. (Year: 2022).*

(Continued)

*Primary Examiner* — Alina A Boutah
(74) *Attorney, Agent, or Firm* — RAY QUINNEY & NEBEKER; Tiffany Healy

(57) ABSTRACT

The present disclosure relates to methods and systems for sharing with a plurality of users a chat session that uses large language models to provide responses for input messages received for the chat session. The methods and systems provide access to the chat session to the users and update the chat session in response to any changes made to the chat session by any of the users. The methods and systems allow the users to resume the chat session at a future time using the chat session history.

17 Claims, 4 Drawing Sheets

(56) References Cited

U.S. PATENT DOCUMENTS

| | | | | |
|---|---|---|---|---|
| 2016/0308799 | A1* | 10/2016 | Schubert | H04L 51/046 |
| 2017/0099238 | A1* | 4/2017 | Malik | H04L 51/216 |
| 2022/0232126 | A1* | 7/2022 | Naidu | H04M 3/5166 |
| 2023/0074406 | A1* | 3/2023 | Baeuml | G10L 15/183 |
| 2023/0321548 | A1* | 10/2023 | Vogel | A63F 13/67 463/42 |
| 2023/0343324 | A1* | 10/2023 | Baeuml | G10L 15/22 |
| 2024/0086648 | A1* | 3/2024 | Han | G06N 7/01 |
| 2024/0194180 | A1* | 6/2024 | Goldshtein | G10L 13/047 |
| 2024/0205174 | A1* | 6/2024 | Bailey | G06F 40/30 |

OTHER PUBLICATIONS

Ziv Gidron, "Language Models, Conversational AI, and Chatbots," Dec. 15, 2021. (Year: 2021).*

Mao., et al., "Multi-User Chat Assistant (MUCA): a Framework Using LLMs to Facilitate Group Conversations", Computation and Language, Feb. 16, 2024, 29 pages.

Toxtli, et al., "Understanding chatbot-mediated task management." In Proceedings of the 2018 CHI conference on human factors in computing systems, Issue. 58, Feb. 9, 2018, pp. 1-6.

Tran, et al., "Improving Chatbot Responses with Context and Deep Seq2Seq Reinforcement Learning." Preprint from Research Square, Jan. 31, 2023, pp. 1-16.

Walker, et al., "Mixed Initiative in Dialogue: An Investigation into Discourse Segmentation", arXiv preprint cmp-lg/9504007, Apr. 5, 1995, pp. 1-9.

Wang, et al., "Plan-and-solve prompting: Improving zero-shot chain-of-thought reasoning by large language models." arXiv preprint arXiv:2305.04091, May 26, 2023, pp. 1-24.

Wang, et al., "Task-oriented dialogue system as natural language generation." In Proceedings of the 45th International ACM SIGIR Conference on Research and Development in Information Retrieval, Apr. 24, 2022, pp. 2698-2703.

Wanger, et al., "Comparing moderation strategies in group chats with multi-user chatbots." In Proceedings of the 4th Conference on Conversational User Interfaces, Issue. 35, Sep. 15, 2022, pp. 1-4.

Wu, et al., "Bloomberggpt: A large language model for finance." arXiv preprint arXiv:2303.17564, Dec. 21, 2023, pp. 1-76.

Wu, et al., "Autogen: Enabling next-gen llm applications via multi-agent conversation framework" arXiv preprint arXiv:2308.08155, Oct. 3, 2023, pp. 1-43.

Yang, et al., "UBAR: Towards fully end-to-end task-oriented dialog system with GPT-2." In Proceedings of the AAAI Conference on Artificial Intelligence, vol. 35, Issue. 16, May 18, 2021, pp. 14230-14238.

Yao, et al., "Tree of thoughts: Deliberate problem solving with large language models." Advances in Neural Information Processing Systems 36, 2024, pp. 1-14.

Young, et al., "Pomdp-based statistical spoken dialog systems: A review." Proceedings of the IEEE 101, Issue. 5, May 5, 2013, pp. 1160-1179.

Yu, et al., "Learning conversational systems that interleave task and non-task content." arXiv preprint arXiv:1703.00099, Mar. 1, 2017, pp. 1-8.

Yu, et al., "Strategy and policy learning for nontask-oriented conversational systems", Proceedings of the 17th Annual Meeting of the Special Interest Group on Discourse and Dialogue, Sep. 2016, pp. 404-412.

"LangChain," available at https://en.wikipedia.org/wiki/LangChain Wikipedia article, accessed on Oct. 26, 2023, 3 pages.

Achiam et al., "Gpt-4 technical report.", arXiv preprint arXiv:2303.08774, Mar. 1, 2024, pp. 1-100.

Anil, et al., "PaLM 2 Technical Report", In Repository of arXiv:2305.10403v1, Sep. 13, 2023, pp. 1-93.

Avula, et al., "SearchBots: User Engagement with ChatBots during Collaborative Search" Proceedings of the 2018 Conference on Human Information Interaction & Retrieval, Mar. 1, 2018, pp. 52-61.

Braden et al., "Learning from dialogue after deployment: Feed yourself, chatbot!." arXiv preprint arXiv:1901.05415, Jun. 13, 2019, pp. 1-18.

Brown, et al., "Language Models are Few-Shot Learners", In Repository of arXiv:2005.14165, Jul. 22, 2020, 75 pages.

Chen, et al., "Evaluating Large Language Models Trained on Code", arXiv:2107.03374v2, Jul. 14, 2021, Retrieved from the internet: URL: https://arxiv.org/pdf/2107.03374.pdf, 35 pages.

Cranshaw et al., "Calendar. help: Designing a workflow-based scheduling agent with humans in the loop", CHI '17: Proceedings of the 2017 CHI Conference on Human Factors in Computing Systems, May 2, 2017, pp. 2382-2393.

Do et al., "How Should the Agent Communicate to the Group? Communication Strategies of a Conversational Agent in Group Chat Discussions", Proceedings of the ACM on Human-Computer Interaction, vol. 6, Issue 387, Nov. 11, 2022, pp. 1-23.

Ehsan et al., "A simple language model for task-oriented dialogue." Advances in Neural Information Processing Systems 33, May 2, 2020, pp. 20179-20191.

Emanuel A. Schegloff, "Sequencing in conversational openings 1." American anthropologist, vol. 70, Issue. 6, Dec. 1968, pp. 1075-1095.

Isabella Grabi, "A survey on reinforcement learning for dialogue systems." Chair of Intelligent Systems University of Passau, Germany, 2019, pp. 1-6.

Jaques et al., "Way off-policy batch deep reinforcement learning of implicit human preferences in dialog." arXiv preprint arXiv:1907.00456, Jul. 8, 2019, pp. 1-16.

Jhan et al., "Cheerbots: Chatbots toward empathy and emotionusing reinforcement learning." arXiv preprint arXiv:2110.03949, Oct. 8, 2021, pp. 1-16.

Julia et al., "Offline reinforcement learning from human feedback in real-world sequence-to-sequence tasks." arXiv preprint arXiv:2011.02511, Jun. 9, 2021, pp. 1-7.

Kim et al., "Bot in the bunch: Facilitating group chat discussion by improving efficiency and participation with a chatbot." In Proceedings of the 2020 CHI Conference on Human Factors in Computing Systems, Apr. 23, 2020, pp. 1-13.

Kim et al., "Speech sentiment and customer satisfaction estimation in socialbot conversations." arXiv preprint arXiv:2008.12376, Aug. 27, 2020, pp. 1-5.

Kwan et al., "A Survey on Recent Advances and Challenges in Reinforcement Learning Methods for Task-oriented Dialogue Policy Learning." Machine Intelligence Research, vol. 20, Issue. 3, Jan. 7, 2023, pp. 318-334.

Lee et al., "Prompted LLMs as Chatbot Modules for Long Open-domain Conversation." arXiv preprint arXiv:2305.04533, May 8, 2023, pp. 1-16.

Lewis, et al., "Retrieval-Augmented Generation for Knowledge-Intensive NLP Tasks", In Proceedings of 34th Conference on Neural Information Processing Systems, Dec. 6, 2020, pp. 1-16.

Li et al., "End-to-end task-completion neural dialogue systems." arXiv preprint arXiv:1703.01008, Feb. 11, 2018, pp. 1-11.

Li et al., "Deep Reinforcement Learning for Dialogue Generation", arXiv preprint arXiv:1606.01541, Sep. 29, 2016, pp. 1-11.

Liang, et al., "Encouraging Divergent Thinking in Large Language Models through Multi-Agent Debate." arXiv preprint arXiv:2305.19118, May 30, 2023, pp. 1-15.

Liu, et al., "Iterative policy learning in end-to-end trainable task-oriented neural dialog models", In 2017 IEEE Automatic Speech Recognition and Understanding Workshop (ASRU), Dec. 20, 2017, pp. 482-489.

Lu et al., "Chameleon: Plug-and-play compositional reasoning with large language models." Advances in Neural Information Processing Systems 36, 2023, pp. 1-32.

Markov et al., "A holistic approach to undesired content detection in the real world." In Proceedings of the AAAI Conference on Artificial Intelligence, vol. 37, Issue. 12, Jun. 26, 2023, pp. 15009-15018.

Ouyang, et al., "Training language models to follow instructions with human feedback", Advances in Neural Information Processing Systems (NeurIPS ), 2022, pp. 27730-27744.

(56) References Cited

OTHER PUBLICATIONS

Papaioannou, et al., "Hybrid chat and task dialogue for more engaging hri using reinforcement learning." In 2017 26th IEEE International symposium on robot and human interactive communication (RO-MAN), Dec. 14, 2017, pp. 1-6.
Pawel, et al., "Hello, it's gpt-2-how can i help you? towards the use of pretrained language models for task-oriented dialogue systems", In respiratory arXiv:1907.05774, Aug. 4, 2019, pp. 1-8.
Radford, et al., "Language Models are Unsupervised Multitask Learners," available at https://cdn.openai.com/better-language-models/language_models_are_unsupervised_multitask_learners.pdfOpenAI, OpenAI, San Francisco, California, Feb. 14, 2019, 24 pages.
Sankar, et al., "Deep reinforcement learning for modeling chit-chat dialog with discrete attributes." arXiv preprint arXiv:1907.02848, Sep. 14, 2019, pp. 1-10.
Schatzmann, et al., "A Survey of Statistical User Simulation Techniques for Reinforcement-Learning of Dialogue Management Strategies", The knowledge engineering review, vol. 21, Issue. 2, Jun. 1, 2006, pp. 97-126.
Schatzmann, et al., "Agenda-based user simulation for bootstrapping a POMDP dialogue system," In Human Language Technologies 2007: The Conference of the North American Chapter of the Association for Computational Linguistics; Companion Volume, Short Papers, Apr. 2007, pp. 149-152.
See, et al., "Understanding and predicting user dissatisfaction in a neural generative chatbot." In Proceedings of the 22nd Annual Meeting of the Special Interest Group on Discourse and Dialogue, Jul. 29, 2021, pp. 1-12.
Serban, et al., "A Deep Reinforcement Learning Chatbot", arXiv preprint arXiv:1709.02349, Nov. 5, 2017, pp. 1-9.
Su, et al., "Learning from real users: Rating dialogue success with neural networks for reinforcement learning in spoken dialogue systems." arXiv preprint arXiv:1508.03386, Aug. 13, 2015, pp. 1-5.
Su, et al., "multi-task pre-training for plug-and-play task-oriented dialogue system." arXiv preprint arXiv:2109.14739, Mar. 1, 2022, pp. 1-16.
Su, et al., "On-line active reward learning for policy optimisation in spoken dialogue systems." arXiv preprint arXiv:1605.07669, Jun. 2, 2016, pp. 1-11.
Tamkin, et al., "Understanding the Capabilities, Limitations, and Societal Impact of Large Language Models", arXiv preprint arXiv:2102.02503, Feb. 4, 2021, pp. 1-8.
Team, "Gemini: a family of highly capable multimodal models." arXiv preprint arXiv:2312.11805, Dec. 19, 2023, pp. 1-62.
Teven, et al., "Bloom: A 176b-parameter open-access multilingual language model." arXiv preprint arXiv:2211.05100, Jun. 27, 2023, pp. 1-73.
Thoppilan, et al., "Lamda: Language models for dialog applications", In Repository of arXiv:2201.08239v1, Jan. 20, 2022, pp. 1-47.
Thosani, et al., "A self learning chat-bot from user interactions and preferences." In 2020 4th International Conference on Intelligent Computing and Control Systems (ICICCS), Jun. 19, 2020, pp. 224-229.
Touvron, et al., "Llama 2: Open Foundation and Fine-Tuned Chat Models," In Repository of arXiv:2307.09288v2, Jul. 19, 2023, 23 Pages.
Walker, et al., "PARADISE: a Framework for Evaluating Spoken Dialogue Agents" In 35th Annual Meeting of the Association for Computational Linguistics and 8th Conference of the European Chapter of the Association for Computational Linguistics, arXiv preprint cmp-lg/9704004, Apr. 15, 1997, pp. 271-280.
Wang, et al., "Self-Consistency Improves Chain of Thought Reasoning in Language Models", arXiv preprint arXiv:2203.11171, Mar. 7, 2023, pp. 1-24.
Wanwei et al., "Galaxy: A generative pre-trained model for task-oriented dialog with semi-supervised learning and explicit policy injection." In Proceedings of the AAAI conference on artificial intelligence, vol. 36, Issue 10, Jun. 28, 2022, pp. 10749-10757.
Wanwei et al., "Space-2: Tree-structured semi-supervised contrastive pre-training for task-oriented dialog understanding." arXiv preprint arXiv:2209.06638, Sep. 14, 2022, pp. 1-17.
Wei, et al., "Chain-of-Thought Prompting Elicits Reasoning in Large Language Models," arXiv, arXiv:2201.11903v6 [cs.CL], Jan. 10, 2023, 43 pages.
Williams, et al., "End-to-end LSTM-based dialog control optimized with supervised and reinforcement learning." arXiv preprint arXiv:160601269, June.3, 2016, pp. 1-10.

\* cited by examiner

COPILOT FOR MULTI-USER, MULTI-STEP COLLABORATIONS

CROSS-REFERENCE TO RELATED APPLICATIONS

This application claims priority to and the benefit of U.S. Provisional Patent Application No. 63/522,500, filed on Jun. 22, 2023, which is hereby incorporated by reference in its entirety.

BACKGROUND

Large language models (LLMs) have become increasingly popular due to their ability to generate fluent and coherent text in response to various input prompts. Advancements in LLMs have enabled new products and services, new business models, and efficiencies in business processes across various domains. However, LLM-backed chat applications or services typically support chat sessions that are linear (input-response sequential chains) and are limited to a fixed number of turns. The context of the LLM is limited to the number of tokens the LLM can support. The context the LLM generates outputs for is limited to the prompt that can be provided to the LLM, which can include the user inputs and system responses that have happened before within a given session.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes providing, to a plurality of users, access to a chat session that uses a plurality of large language models. The method includes receiving changes to the chat session. The method includes updating the chat session in response to the changes to the chat session, wherein the plurality of large language models use the changes to the chat session in responding to subsequent input messages received for the chat session.

Some implementations relate to a device. The device includes a processor; memory in electronic communication with the processor; and instructions stored in the memory, the instructions being executable by the processor to: provide, to a plurality of users, access to a chat session that uses a plurality of large language models; receive changes to the chat session; and update the chat session in response to the changes to the chat session, wherein the plurality of large language models use the changes to the chat session in responding to subsequent input messages received for the chat session.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
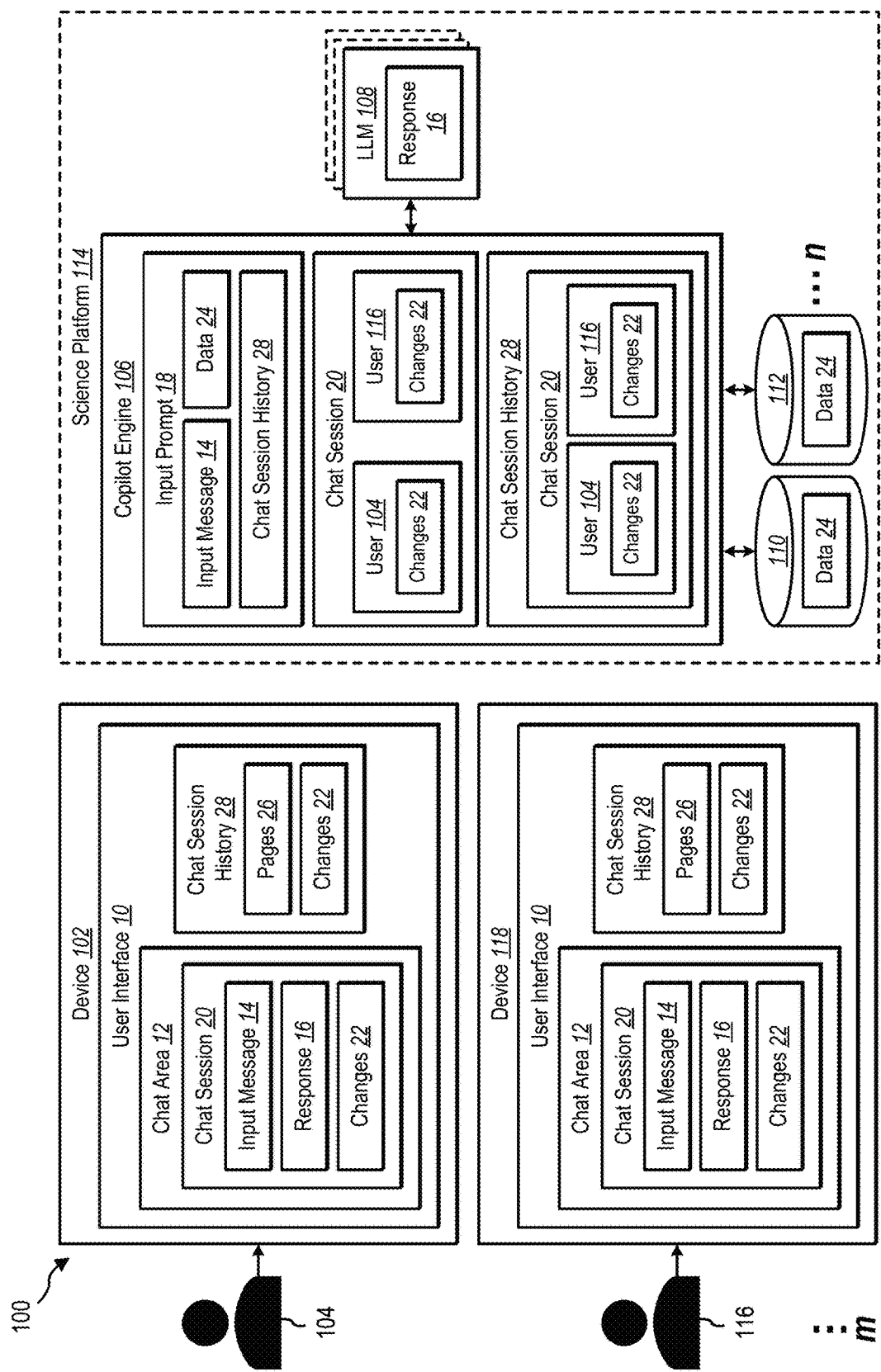
FIG. 1 illustrates an example environment for using a science platform to support activities in accordance with implementations of the present disclosure.

Large language models (LLMs) have achieved significant advancements in various natural language processing (NLP) tasks. LLMs refer to machine learning artificial intelligence (AI) models that can generate natural language text based on the patterns they learn from processing vast amounts of data. LLMs use deep neural networks, such as transformers, to learn from billions or trillions of words, and to produce text on any topic or domain. LLMs can also perform various NLP tasks, such as classification, summarization, translation, generation, and dialogue.

LLMs have demonstrated a remarkable ability in generating fluent and coherent text in response to various input prompts (e.g., questions or dialog). Advancements in LLMs have enabled new products and services, new business models, and efficiencies in business processes across various domains. One example of new products and services is copilots that help amplify the capabilities of humans performing specific types of tasks. For example, a copilot helps developers work more efficiently by generating code from descriptions, generating documentation, and helping look up functions. Another example includes a copilot allowing users to do multi-turn interactions with a search engine and get results surfaced directly within the chat (with links to sources), thereby saving the users the effort of having to browse multiple links looking for the relevant information. Another example includes a copilot reducing the manual intervention required in productivity tasks.

However, the copilots being developed are constrained by the capabilities of the underlying large language models (LLMs) themselves. LLM-backed chat applications or services typically support chat sessions that are linear (input-response sequential chains) and are limited to a fixed number of turns. For example, the number of turns in a chat session could be limited to 15 or 20. The context of the LLM is limited to the number of tokens the LLM can support, and the entire session (user inputs and systems responses) needs to be managed within this limitation.

The methods and systems provide a copilot engine to support activities to go beyond linear chat and current constraints of the LLM models. Activities that are multi-user and/or multi-step (optionally, long-running) may need to go beyond linear chat and current constraints of the LLM models. In addition, activities that are multi-user and/or multi-step may have a lot of branching, involve multiple participants, and/or need to support examination and auditing of work. Examples of activities that are multi-user and/or multi-step include product design, escalation resolution, and research.

Research is a uniquely collaborative activity, both within teams and across stages of the end-to-end process, spanning multiple disciplines, teams, areas of expertise, and perspectives. It is important to have the assumptions, thought processes, and insights captured so participants can effectively contribute to enhance the quality of the output while also mitigating any potential risks.

Research is critical to enterprises' long-term survival and success. It is vital to leverage past learnings, both within the organization and across the domain, to accelerate current efforts. For example, in Pharma, thousands of molecules get studied before one or two make it to the market as medicines. However, the knowledge from all the molecules that have been studied remains locked up within lab notebooks, experiment reports, and regulatory filings. There is tremendous value in being able to leverage this knowledge given advances for retargeting, better management of side effects, changes in regulations, and improvements in manufacturing processes.

In research activities there is also the need to keep up with the ever-changing and fragmented regulatory landscape across different countries and governments. For example, it might be easier to get approval for a new medicine in one country versus another, and the aspects that determine the outcome could be influenced by factors varying from laws in effect at a given point in time to severity, spread or prevalence of a disease within a specific population or country.

In research activities it is very important to manage the compliance risks and costs effectively while maintaining innovation agility and speed. There is also the opportunity to leverage technology to even automate many of the compliance processes and to monitor regulatory changes, effectively mining the new laws and announcements to feed back the insights and impact to enable activities within an enterprise to adapt to evolving realities and prioritize investments and focus accordingly.

Given that most of these industries (for example, Energy, Pharma, and Material Sciences) are highly regulated, it is essential to provide a complete audit trail of all inferences and activities, making it easier to trace the source of any issues and also answer any regulatory inquiries. Traceability also makes it easier for multiple human experts, with their own knowledge and points of view, to examine the chain of reasoning and identify potential risks and implement controls as needed to mitigate those risks, thereby reducing the likelihood of non-compliance and legal issues around negligence.

Effective research happens when knowledge and creativity come together. Information retrieval questions can be pretty deep and facilitated by an LLM model or chat experience supporting research activities. However, the overall research activity tends to be bushy. Examples of how research activities tend to be bushy include: there are multiple hypotheses or avenues that researchers try to explore; researchers might go back to some idea or path of reasoning that was shelved before; researchers want to maintain context across these paths and be able to move between them; abandon dead-end reasoning paths and prune; researchers need to be able to see emerging patterns: two temporally distant paths of reasoning might converge to a common path, idea/opportunity, or conclusion; researchers might need to share parts of their reasoning with colleagues to get their feedback or contributions; researchers need to archive chunks of reasoning as lessons learnt, or for filing for approval with regulatory agencies where researchers need to show your work (and not just the final result); and researchers might want to reuse specific threads of reasoning as knowledge, best practices, or processes for accomplishing a goal. These flows could then be used as building blocks for other researchers within the organization.

Research activities need support beyond linear evolution of chat over limited context. A researcher is not following a specification and does not start or resume a research activity with a set of questions that lead to a desired outcome after a set number of turns. A researcher is typically working with a team during the research process where members of the team contribute to the research activity.

The present disclosure includes several practical applications that provide benefits and/or solve problems associated with using LLMs to support multi-user and/or multi-step activities. The methods and systems provide a science platform to support the multi-user and/or multi-step activities. The science platform helps users explore new ideas for activities. For example, the science platform helps users develop products or solutions during the research process and test the products or solutions. The science platform provides a canvas that multiple users can access during activities. The science platform integrates a plurality of sources of data, functions (e.g., Sort, Filter, etc.), AI models, high-performance computing (HPC) workloads (simulations, optimizations, Quantum functions), solvers, and a copilot engine.

The copilot engine amplifies the capabilities of LLMs for use with multi-user and/or multi-step activities and workflows. The copilot engine supports multi-user and/or multi-step activities using one or more LLMs that generate responses to input messages provided by the users during the activities. For example, the copilot engine uses an LLM fine-tuned on domain concepts when users seek domain-specific information using the copilot engine and uses other LLMs to trace the state and evolution of multiple threads in a chat session. The copilot engine preprocesses and transforms the input messages provided by the users, retrieves relevant document or data from available data sources, and generates answers to the input messages using the LLMs and the data sources available.

The canvas allows the users to share a single chat session with the LLMs. A chat session allows the users to send messages to one another and communicate with one another. In some implementations, the chat session starts when a user initiates the chat session or sends a first message to one or more users. In some implementations, the chat session starts in response to the LLM providing a question to the user(s). In some implementations, the chat session starts in response to the copilot engine providing a question to the user(s). In some implementations, the chat session is between the copilot engine and a single user (e.g., ChatGPT or BING CHAT). The chat session may be created by one of the users providing input messages for an activity to the copilot engine and receiving a response from the copilot engine. In some implementations, the chat session includes a main chat that involves the entire group of users in the chat session and may be focused on the overarching activity or goal and one or more side conversations (which are side chats). For example, a side conversation is breakout group discussions with a subgroup of users in the chat session. Another example of a side conversation is a discussion targeting sub-activities or explorations of the activity with the entire group of users or a subgroup of users.

The copilot engine responds to the input message, either from using the LLM or using the knowledge representations available to the copilot engine. Any of the users who have access to the chat session by being added to it by anyone (including the Copilot) access to the chat session may provide input messages to the copilot engine and have already in the session, may co-edit the chat session. In addition, any of the users who have responses to the input message populate within the chat session.

Users may participate in multiple activities and may have multiple chat sessions occurring at the same time. In some implementations, the multiple chat sessions are with different users. In some implementations, the multiple chat sessions are with the same users. The users may use the canvas to move between different chat sessions for each activity. The users may also use the canvas to resume chat sessions in the future.

One technical advantage of the methods and systems of the present disclosure is sharing a single chat session with LLMs with a plurality of users. Another technical advantage of the methods and systems of the present disclosure is the LLM maintains context across the group conversation in the chat session when all users are discussing the same topic or goal. Another technical advantage of the methods and systems of the present disclosure is the LLM maintains context of multiple side conversations of chat sessions simultaneously. Another technical advantage of the methods and systems of the present disclosure is allowing modifications of the chat session by any of the users. Another technical advantage of the methods and systems of the present disclosure is providing long running chat sessions (which users can also resume in the future) with LLMs without limits on session length.

Referring now to FIG. 1, illustrated is an example environment 100 for use with a science platform 114 that provides support for activities. In some implementations, the activities are multi-user and/or multi-step activities that have branching, involve multiple participants, and/or need to support examination and auditing of work. Example multi-user and/or multi-step activities include product design, escalation resolution, and research activities. In some implementations, the activities are long running (e.g., occur over weeks, months, or years). The science platform 114 integrates data sources 110, 112 up to n (where n is a positive integer) of data 24 for use with the science platform 114, and a copilot engine 106 to support interactions with one or more LLMs 108. The copilot engine 106 preprocesses and transforms the input messages 14 received from the user 104, retrieves relevant document or data from available data sources, and generates answers to the input messages 14. The copilot engine 106 generates responses 16 to the input messages 14 directly, either from the LLM(s) 108 or using the knowledge representations available to the copilot engine 106.

In some implementations, the copilot engine 106 uses a single LLM 108 to generate the responses 16 to the input messages 14. In some implementations, the copilot engine 106 uses a plurality of LLMs 108 to generate the responses 16 to the input messages 14. For example, the copilot engine 106 uses an LLM fine-tuned on domain concepts when users seek domain-specific information using the copilot engine and uses other LLMs to trace the state of a chat session 20 and evolution of multiple side conversations in the chat session 20. Another example includes the copilot engine 106 using more than one instance of each LLM 108 to support higher throughput and provide a better user experience for the chat session 20. Examples of the LLM 108 include GPT-3, GPT-4, BERT, XLNET, AND LLAMA 2.

The science platform 114 provides end-to-end support for activities. The science platform 114 includes a large collection of data 24 including AI models (from a service provider of the science platform 114 and created by users 104 of the science platform 114) and functions from the built-in programming language that are leveraged by the science platform 114 to support activity flows of the users 104. For example, the users 104 access the science platform 114 to explore new ideas for research using the LLM 108, develop products or solutions using the LLM 108, and test the products or solutions using the LLM 108. The science platform 114 provides a centralized location for supporting the research processes.

The science platform 114 is accessible to a plurality of users up to m (where m is a positive integer) using a user interface 10 on devices of the users. In some implementations, a plurality of devices are in communication with the science platform 114 and users may access the science platform 114 from different devices. For example, a user 104 uses a user interface 10 on a device 102 of the user 104 to access the science platform 114 and a user 116 uses the user interface 10 on the device 118 to access the science platform 114.

In some implementations, the science platform 114 is on a server (e.g., a cloud server) remote from the devices 102, 116 of the users 104, 116 accessed via a network. The network may include the Internet or other data link that enables transport of electronic data between respective devices and/or components of the environment 100. For example, a uniform resource locator (URL) configured to an end point of the science platform 114 is provided to the device 102 and the device 118 for accessing the science platform 114 and communicating with the science platform 114. In some implementations, the science platform 114 is local to the devices 102, 116 of the users 104, 116.

The user interface 10 is presented on a display of the devices 102, 118 and the user interface 10 includes a chat area 12 that the users 104, 116 use to provide input messages 14 to the copilot engine 106 of the science platform 114 and for a chat session 20 with the LLM 108. The chat area 12 is a portion of the user interface 10 that presents the messages for the chat session 20 and where the users 104, 116 interact with the chat session 20.

In some implementations, the input message 14 provided by the user 104 starts the chat session 20 with the LLM 108. In some implementations, the input message 14 provided by the user 116 starts the chat session 20 with the LLM 108. In some implementations, the LLM 108 engages with the user 104 or the user 116 by sending the user 104 or the user 116 a proactive message (e.g., a message "Can I help you?") to start the chat session 20 with the LLM 108. For example, the LLM 108 sends a proactive message to the users 104, 116 in response to the users 104, 116 accessing the science platform 114. In some implementations, the chat session 20 starts in response to the copilot engine 106 providing a question to the user(s). The chat session 20 includes a plurality of users (chat participants) that have been added to the chat session 20 by anyone (including the copilot engine 106) already in the chat session 20. For example, the user 116 starts the chat session 20 by asking the copilot engine 106 a question (the input message 14) and the user 116 adds the user 104 to the chat session 20.

The input message 14 includes natural language text. The input message 14 can be natural language sentences, questions, code snippets or commands, or any combination of text or code, depending on the domain and the task. One example input message 14 is a question or query. Another example input message 14 is a sentence. Another example input message 14 is a portion of a conversation or dialog. In some implementations, the input message 14 includes a multistep query. In some implementations, the input message 14 includes a query for a product design. In some implementations, the input message 14 includes a query for a research activity. In some implementations, the input message 14 includes a query for escalation resolution. In some implementations, the input messages 14 includes a query to create a formula to run a science model or a query to execute a data operation. In some implementations, the input messages 14 includes a query for a scientific term or seeking an answer to a scientific question. In some implementations, the input messages 14 include a query for help or support using the copilot engine 106.

The copilot engine 106 receives the input message 14 and dynamically constructs an input prompt 18 with the user's 104 input message 14, messages from previous chat history, and other conversational context information. The copilot engine 106 provides the input prompt 18, the input message 14, and data 24 to the LLM 108. The input prompts 18 are the inputs or queries that a user or a program gives to the LLM 108, in order to elicit a specific response from the LLM 108 in response to the input prompt 18.

The copilot engine 106 accesses the data sources 110, 112 of data 24 in the science platform 114 and provides the data 24 to the LLM 108. In some implementations, the data 24 is publicly available information from publicly available data sources 110, 112. Examples of publicly available data sources include scientific journals, scientific documents, patent filings, publications, news, earnings reports, company information, knowledge graphs, mapping information, photographs, biomedical information, clinical data, administrative information, regulations, or geographic data. Another example of publicly available data is AI models available for use by the public. The AI models ingest the data 24 and provide a knowledge representation of the data 24 (e.g., embeddings, graphs, performs functions on the data, etc.). The AI models may be used by all users of the science platform 114.

In some implementations, the data 24 is private information unavailable to the public. An example of private information includes organizational data unavailable to the public, such as, research notes, lab documents, business processes, manufacturing processes, trade secrets, and/or experimental data. Another example of private information is prebuilt indexes, such as, search indexes, embeddings for a domain, and/or knowledge graphs for a domain. Another example of private information is AI models created for an organization for use with the copilot engine 106. For example, users, such as a data scientist for an organization, may onboard AI models for use with the copilot engine 106. The custom AI models are accessible by end users within the organizational subscription and are accessible by the copilot engine 106 to provide to the LLM 108 for use in responding to the input message 14.

In some implementations, the data 24 includes a combination of publicly available information and private information unavailable to the public. For example, the data source 110 has data 24 from a publicly available data index and the data source 112 has data 24 from a private company.

The LLM 108 uses the input prompt 18 and the data 24 in generating a response 16 to the input message 14. An example of the response 16 generated by the LLM 108 is an answer to a query in the input message 14. Another example of the response 16 generated by the LLM 108 is asking questions to the user 104 for clarification. Another example of the response 16 generated by the LLM 108 is a statement that the question cannot be answered.

Another example of the response 16 generated by the LLM is an answer to a scientific question in the input message 14. The LLM 108 uses the data 24 provided by the copilot engine 106 to generate a response 16 with an answer to the scientific question. In some implementations, the response 16 contains a link to the file or the data source 110, 112 that provided the information for the answer, as well as reasoning on how the retrieved information leads to the conclusion in the response 16. For example, the user 104 can click on the link and read the scientific journal or document where the answer was obtained from by the LLM 108. In some implementations, the response 16 provides reasoning on how the data 24 retrieved by the LLM 108 answers the user's 104 question.

In some implementations, the copilot engine 106 uses an LLM tool to rewrite the query from the input message 14 into different alternatives to assist in retrieving the most relevant data from the different data sources 110, 112. Rewriting the query also helps in identifying which data sources 110, 112 to use for the query (e.g., prebuilt libraries and/or indexes for the domain of the query). The rewritten input message and/or any additional information about the data sources 110, 112 is provided to the LLM 108 to use in generating the response 16 with the answer to the scientific question. In some implementations, a plurality of relevant results (e.g., 5 to 20 relevant results) are obtained from the data 24 by the LLM 108 for the response 16. The LLM 108 ranks the relevant results and provides a summarization for each relevant result with reasoning on how the relevant results support answering the user's 104 questions. In some implementations, each relevant result includes a link to the data source 110, 112 that provided the data 24 for the answer included in the response 16. The user 104 may click the link to see the information that provided the answer. In some implementations, the copilot engine 106 uses an LLM tool to reduce or eliminate hallucinations from the relevant results provided by the LLM 108.

Another example of the response 16 generated by the LLM is a plan with steps for answering a query in the input message 14. Each step of the plan includes explicit representation of that step's inputs and outputs allowing the LLM 108 to reason over a potential plan and identify whether the steps could flow from one to the next (i.e., whether a later step's input needs are satisfied by the outputs of previous steps and by any other information or resources available to the planner, which the LLM 108 also knows about). If necessary, the LLM 108 revises the plan to address any gaps that the LLM 108 identifies. The LLM 108 breaks the query of the input message 14 into a plurality of steps. The plan includes the steps in an order and each step in the plan provides an explanation for a purpose of the step. For example, the steps include an explanation of any data sources 110, 112 the LLM 108 is going to use to obtain the data 24, and any AI models or functions the LLM 108 is going to use on the data 24. Functions are an expression or rule that defines a relation from a set of inputs to a set of outputs. For example, a function is a data operation. An example function includes a SORT (Table, Column) function that takes a table and column within the table as input, and returns the table sorted by values in the specified column. Functions are a useful construct to facilitate both data operations, such as SORT (Table, Column), as well as AI models. AI models are trained to recognize certain types of patterns and generate an output based on the training. AI models detect patterns in input data and can generate outputs for inputs they have not been trained on. AI models, by design, can be represented as functions because the AI models take some input data and produce an output based on their training.

The response 16 is provided by the copilot engine 106 for presentation on the user interface 10 in the chat session 20 in response to the input message 14. In some implementations, the user 104 accesses the user interface 10 using the device 102 to access the chat session 20. In some implementations, the user 116 accesses the user interface 10 using the device 118 to access the chat session 20. Both the user 104 and the user 116 have access to the same chat session 20 and can view the input messages 14 and the responses 16 in the chat session 20. In some implementations, the user 104 and the user 116 access the chat session 20 at the same time. In some implementations, the user 104 and the user 116 access the chat session 20 at different times.

In some implementations, the user interface 10 provides icons for the users 104, 116 to provide changes 22 for chat session 20. One example of a change 22 is providing a new input message 14 to the chat session 20. Another example of a change 22 is editing an input message 14 of the chat session 20. For example, the user 116 edits the input message 14 provided by the user 104 to the chat session 20 to send to the LLM 108 and receive a new response 16 to the edited input message 14 for the chat session 20. Another example of a change 22 is removing input messages 14 or responses 16 from the chat session 20.

Another example of a change 22 is editing the response 16 provided by the LLM 108. For example, the user 104 modifies a reasoning chain provided in a step of a plan provided in the response 16 or the user 116 removes a step from the plan provided in the response 16.

Both the user 104 and the user 116 have access to the chat session 20 and can make changes 22 to the chat session 20. Any changes 22 provided by the user 104 and the user 116 to the chat session 20 are captured in the chat session history 28 and used by the LLM 108 in providing subsequent response to subsequent input messages.

The user interface 10 may have an icon the users 104, 116 may select to present the chat session history 28. The chat session history 28 includes the previous input messages 14 provided to the LLM 108 and the previous responses 16 generated by the LLM 108. In some implementations, the chat session history 28 includes pages 26. In some implementations, the pages 26 correspond to the previous responses 16 generated by the LLM 108. In some implementations, the pages 26 correspond to the plans that the LLM 108 provided in the responses 16. In some implementations, the pages 26 are created by a user (e.g., the users 104, 116) manually adding new data to the chat session 20, or manually running functions, including AI models. In some implementations, the pages 26 are results of AI models invoked by the copilot engine 106 based on the inferred user intent. The pages 26 feed into subsequent chat interactions of the chat session 20.

The chat session history 28 allows the users 104, 116 to see the input messages 14 and the responses 16 generated by LLM 108 for the chat session 20. The chat session history 28 also allows the users 104, 116 to inspect the responses 16 generated by the LLM 108 and the supporting information for the responses 16. For example, the user 104 opens up a page 26 for a response 16 and a link is provided to the data source 110, 112 that the LLM 108 used to answer a question in the input message 14, as well as a summary with reasoning on how the retrieved information leads to the conclusion in the response 16.

In some implementations, the chat session history 28 includes an icon that allows the users 104, 116 to provide changes 22 to the pages 26 of the chat session history 28. The users 104, 116 may select the icon to make changes to the chat session history 28. For example, the user 104 adds pages 26 to the chat session history 28. Another example includes the user 116 removes pages 26 from the chat session history 28. Another example includes both the user 104 and the user 116 making edits to a same page 26 from the chat session history 28.

The users 104, 116 use the chat session history 28 to trace the conversation with the LLM 108 and verify the work of the LLM 108. The chat session history 28 allows the users 104, 116 to inspect the pages 26 and modify the pages 26 on the fly in near real time. The chat session history 28 maintains the state of the chat session 20 with the LLM 108 and allows the chat session 20 with the LLM 108 to resume at a future time without having to restart the conversation. The state of the chat session 20 consists of the exchanges between the participants of the chat session 20 (e.g., the users 104, 116) and all the pages 26 created for the chat session 20. As the users 104, 116 provide new input messages 14 to the copilot engine 106 and the responses 16 are received from the LLM 108, new pages 26 are added to the chat session history 28 allowing the chat session 20 to continue with the LLM 108 without adding limits to a number of turns or context to the chat session 20.

Any of the users of the chat session 20 (e.g., the users 104, 116) may resume the chat session 20 at a future time by asking questions or providing inputs to the chat session 20. The chat session history 28 stores the full state of the chat session 20, including the intermediate results as pages 26. The copilot engine 106 stores the chat session 20 so nothing is lost from the chat session 20 when the participants resume the chat session 20 using the copilot engine 106. The users 104, 116 may also ask questions to the copilot engine 106 about the chat history to refresh the user's 104, 116 memories without having to open the pages 26 in the chat session history 28 or browse through the pages 26 in the chat session history 28.

In some implementations, the users 104, 116 have different chat sessions with the copilot engine 106 for different projects the users 104, 116 are working on. For example, the user 104 has one chat session with the copilot engine 106 to ask questions about building a new molecule that is shared with the user 116 and a different chat session with the copilot engine 106 to ask questions about side effects of a drug that is shared with other users of the science platform 114.

Each chat session 20 has an individual chat session history 28 that maintains the state of each chat session 20 with the copilot engine 106. In some implementations, the chat session history 28 tracks the changes 22 made to the chat session 20 by each user 104, 116 so that each user 104, 116 understands how the other user modified the chat session 20.

The user 104 may switch between the chat sessions 20 and use the chat session history 28 for the chat session 20 to remember what input messages 14 have been sent to the copilot engine 106 and what responses 16 have been provided by the LLM 108 in response to the input messages 14. For example, the user 104 returns to the chat session 20 after months of working on a different project while the user 116 continued to work on the project for the chat session 20. The chat session history 28 is maintained for the chat session 20 and the user 104 is able to use the information in the chat session history 28 to understand how the project changed while the user 104 was working on the other project and resume the chat session 20 with the LLM 108.

As the LLM 108 provides response 16 to the input messages 14, the input prompt 18 to the LLM 108 also includes the chat session history 28 and the LLM 108 uses the data 24 and the chat session history 28 in generating the response 16 for the input message 14. Any changes made by the users 104, 116 to the chat session history 28 are stored in the chat session history 28 and are used by the LLM 108 in providing future responses 16 to the input messages 14.

The science platform 114 shares the chat session 20 for an activity among multiple users of the science platform allowing the users to coedit the chat session 20 with the LLM 108 and participate and/or collaborate in the activity. The science platform 114 supports long running activities among multiples users by maintaining the chat session history 28 (that users can resume in the future) without limits on the session length with the LLM 108. For example, the science platform 114 supports long running research activities among multiple users by maintaining the chat session history 28 so that the users may resume the chat session 20 at a future time without limits on the session length with the LLM 108 and/or losing information from the chat session 20.

In some implementations, one or more computing devices (e.g., servers and/or devices) are used to perform the processing of the environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the user interface 10 and the science platform 114 are implemented wholly on the same computing device. Another example includes one or more subcomponents of the user interface 10 and/or the science platform 114 (the copilot engine 106, LLM 108, and/or the data sources 110, 112) are implemented across multiple computing devices. Moreover, in some implementations, one or more subcomponent of the user interface 10 and/or the science platform 114 (the copilot engine 106, LLM 108, and/or the data sources 110, 112) may be implemented are processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

Figure 2:
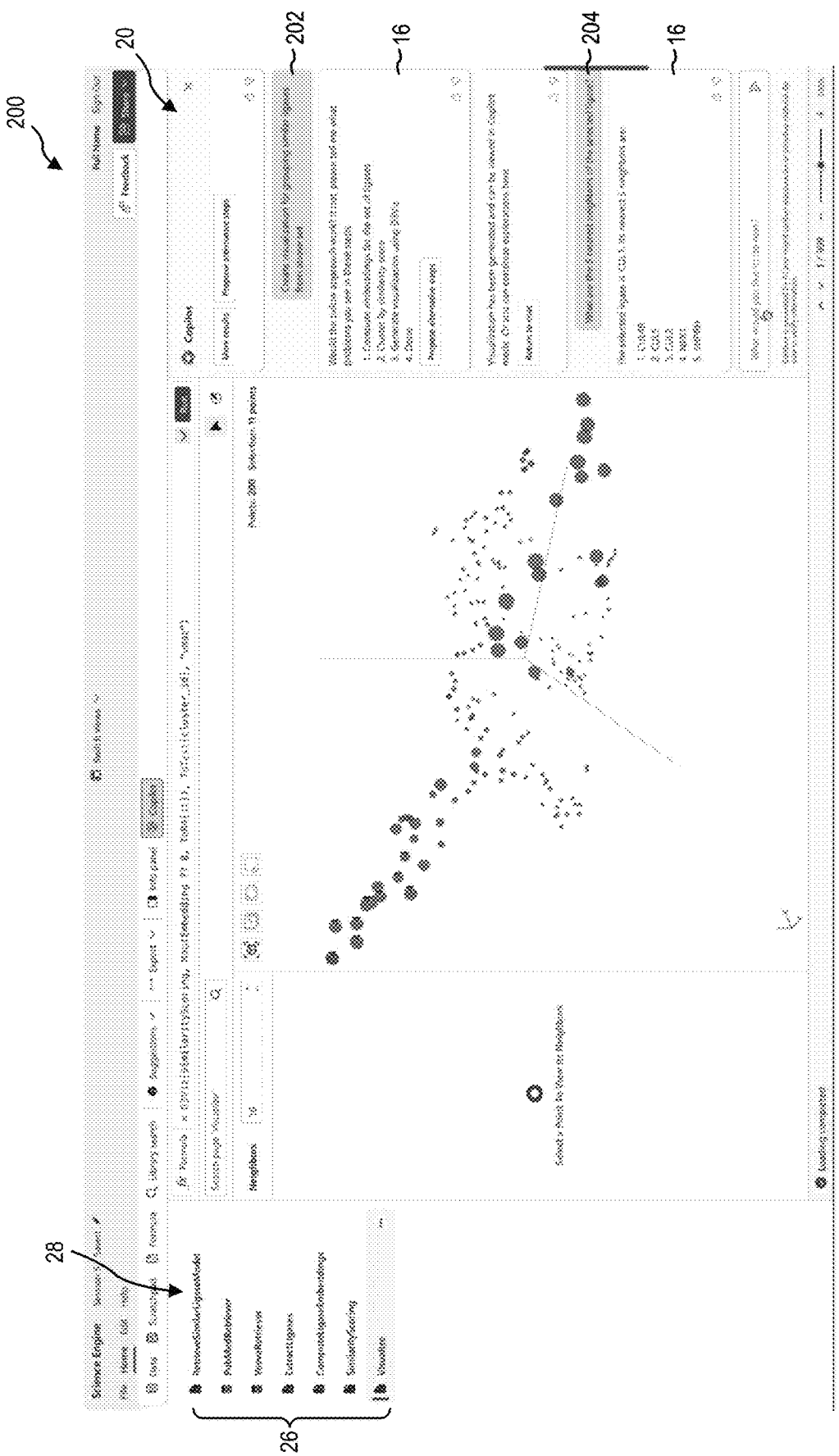
FIG. 2 illustrates an example graphical user interface of a science platform in accordance with implementations of the present disclosure.

FIG. 2 illustrates an example GUI 200 of the science platform 114 (FIG. 1). In some implementations, the GUI 200 is presented on the user interface 10 (FIG. 1) of the device 102 (FIG. 1) and the user 104 (FIG. 1) accesses the GUI 200 using the device 102. In some implementations, the GUI 200 is presented on the user interface 10 of the device 118 (FIG. 1) and the user 116 (FIG. 1) accesses the GUI 200 using the device 118. In some implementations, the GUI 200 is presented on the user interface 10 of both the device 102 and the device 118 at the same time.

The GUI 200 includes the chat session 20 with the LLM 108 (FIG. 1). The chat session 20 includes the input messages 202, 204 (e.g., the input message 14 (FIG. 1)) for the LLM 108 and the responses 16 provided by the LLM 108 in response to the input messages 202, 204. For example, the user 104 provides the input message 202 and the user 116 provides the input message 204. Both the user 104 and the user 116 are able to use the GUI 200 to interact with the chat session 20.

The GUI 200 includes the chat session history 28. In some implementations, the chat session history 28 includes The chat session history 28 includes the pages 26 that correspond to the different responses 16 that the LLM 108 has provided to the input messages 202, 204.

The users 104, 116 may use the GUI 200 to access the chat session history 28 and make changes 22 (FIG. 1) to the chat session history 28. For example, the user 104 makes an edit to the input message 204 provided by the user 116. Another example includes the user 116 makes an edit to the response 16 provided by the LLM 108. Any changes 22 made by the users 104, 116 to the chat session 20 are updated in the chat session history 28 and used by the LLM 108 in provided future responses 16 to input messages 14.

The users 104, 116 may continue the chat session 20 by adding a new input message 14. The LLM 108 uses the chat session history 28, the data 24 (FIG. 1), and the input messages 14 to provide a response 16 to the input message 14. As the users 104, 116 provide input messages 14 to the copilot engine 106 and receives the responses 16 from the LLM 108, new pages 26 are added to the chat session history 28 that correspond to the input messages 14 and the responses 16 allowing the chat session to continue with the LLM 108 without adding limits to a number of turns or context to the chat session.

The user 104 may select any of the pages 26 and see the information provided by the LLM 108. The pages 26 allow the users 104, 116 to easily navigate through the chat session history 28 and provide information supporting different responses 16 provided by the LLM 108. The pages 26 may be used by the users 104, 116 for traceability or auditing of the chat session 20. The pages 26 provide information supporting the conclusions or answers provided in the chat session 20 by the LLM 108.

The users 104, 116 may use the GUI 200 to easily navigate between different chat sessions 20 the users 104, 116 may be involved with.

Figure 3:
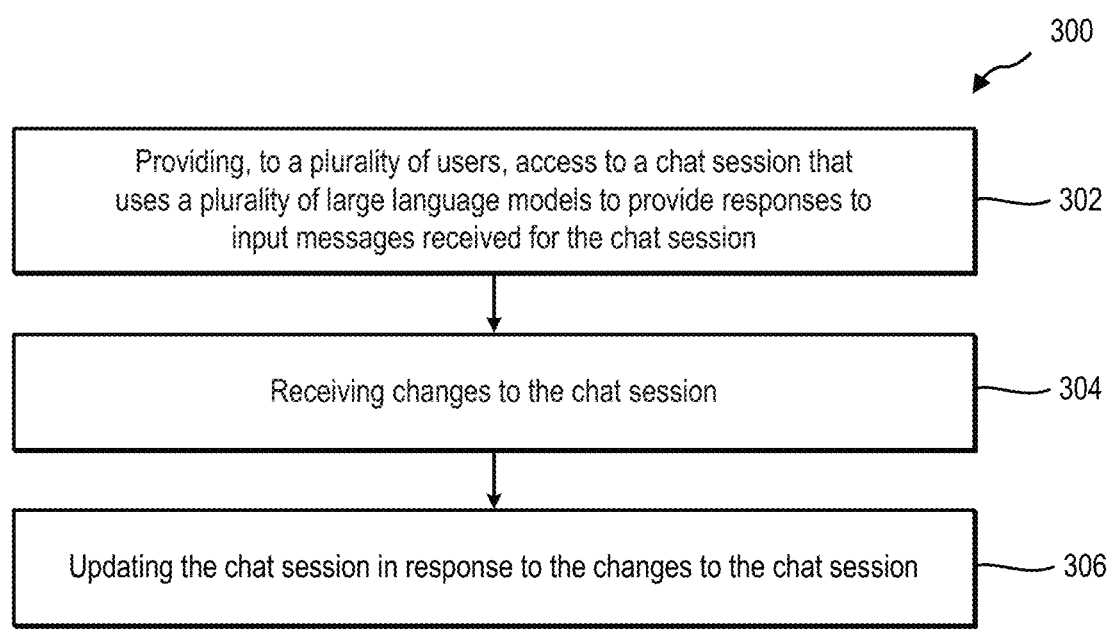
FIG. 3 illustrates an example method for sharing a chat session with a plurality of users in accordance with implementations of the present disclosure.

FIG. 3 illustrates a method for sharing a chat session with a plurality of users. The actions of the method 300 are discussed below with reference to FIGS. 1 and 2.

At 302, the method 300 includes providing, to a plurality of users, access to a chat session that uses a plurality of large language models to provide responses to input messages received for the chat session. The copilot engine 106 provides access to a chat session 20 that uses a plurality of LLMs 108 to a plurality of users (e.g., the user 104, the user 116 up to m users (where m is a positive integer)). Users may be added to the chat session 20 by anyone (including the copilot engine 106) already in the chat session 20. For example, the user 104 is in the chat session 20 and adds the user 116 to the chat session 20.

The users may access the chat session 20 from different devices. In some implementations, the first user (e.g., the user 104) accesses the chat session 20 from a first device (e.g., the device 102) and the chat session 20 is displayed on a user interface 10 of the first device (e.g., the device 102). In some implementations, the second user (e.g., the user 116) accesses the chat session 20 from a second device (e.g., the device 118) and the chat session 20 is displayed on a user interface 10 of the second device (e.g., the device 118).

In some implementations, the LLMs 108 retrieve relevant data from a grounded dataset for answering an input message 14 for the chat session 20, and output a response 16 with the relevant data with reference links identifying a source of the relevant data and a summary with reasoning on how the retrieved relevant data leads to the conclusion in the response 16.

Any of the users in the chat session 20 may access the chat session 20 at the same time and/or may access the chat session 20 at different times. In some implementations, the first user (e.g., the user 104) and the second user (e.g., the user 116) access the chat session 20 at a same time. In some implementations, the first user (e.g., the user 104) and the second user (e.g., the user 116) access the chat session 20 at different times to make changes to the chat session history 28.

At 304, the method 300 includes receiving changes to the chat session. The copilot engine 106 receives changes 22 to the chat session 20 from any of the plurality of users (e.g., the user 104, the user 116, or any other participant of the chat session 20). In some implementations, the copilot engine 106 receives the changes 22 to the chat session 20 from two or more users of chat session 20 (e.g., the user 104, the user 116 up to m users (where m is a positive integer)). In some implementations, the changes 22 include a modification to a previous input message 14 or response 16 in the chat session 20.

In some implementations, the changes 22 include an input message 14 provided to the LLMs 108 from the first user (e.g., the user 104) and the chat session 20 is updated to include the input message 14 and a response 16 from the LLMs 108 in response to the input message 14. In some implementations, the changes 22 include an edit by the second user (e.g., the user 116) to the input message 14 provided by the first user (e.g., the user 104). In some implementations, the changes 22 include an input message 14 provided to the LLMs 108 from the second user (e.g., the user 116) and the chat session 20 is updated to include the input message 14 and a response 16 from the LLMs 108 in response to the input message 14. In some implementations, the changes 22 include the first user (e.g., the user 104) removing the input message 14 from the chat session 20.

In some implementations, the changes 22 include a first input message provided to the LLMs 108 from the first user (e.g., the user 104) and the chat session 20 is updated to include the first input message and a first response from the LLMs 108 to the first input message; and a second input message provided to the LLMs 108 from the second user (e.g., the user 116) and the chat session 20 is updated to include the second input message and a second response from the LLMs 108 to the second input message.

In some implementations, the responses 16 received from the LLMs 108 include a plan with steps for responding to an input message 14 and the changes 22 to the chat session 20 include modifications to the plan.

At 306, the method 300 includes updating the chat session in response to the changes to the chat session. The copilot engine 106 updates the chat session 20 with the changes 22 to the chat session 20. The LLMs 108 use the changes 22 in responding to subsequent input messages 14 received for the chat session 20.

In some implementations, the copilot engine 106 stores the changes 22 to the chat session 20 in a chat session history 28. The chat session history 28 maintains a state of the chat session 20. The state of the chat session 20 includes exchanges between the users of the chat session 20 (e.g., the users 104, 116) and the pages 26 created for the chat session 20. In some implementations, the state of the chat session 20 includes the context (e.g., the exchanges between the users and the pages 26 created) for a main chat session 20 and multiple side conversations of the chat session 20.

In some implementations, the pages 26 correspond to input messages 14 received in the chat session 20 from any of the users of the chat session 20 and the responses 16 to the input messages 14 provided by the LLMs 108. In some implementations, the pages 26 correspond to the plans that the LLMs 108 provided in the responses 16. In some implementations, the pages 26 are created by a user (e.g., the users 104, 116) manually adding new data to the chat session 20, or manually running functions, including AI models. In some implementations, the pages 26 are results of AI models invoked by the copilot engine 106 based on the inferred user intent. The pages 26 feed into subsequent chat interactions of the chat session 20. The LLMs 108 use the chat session history 28 in preparing subsequent responses to subsequent input messages. In some implementations, the changes 22 include modifications to the pages 26 in the chat history 28.

In some implementations, the copilot engine 106 resumes the chat session 20 at a future time using the chat session history 28. The session history 28 stores the full state of the chat session 20, including the intermediate results as pages 26 and any side conversations of the chat session. Any of the users of the chat session 20 may go back to the chat session 20 and ask questions and receive responses from the copilot engine 106 without losing information from the chat session 20.

The method 300 supports long running chat sessions 20 by maintaining the chat session history 28 (that users can resume in the future) without limits on session length with the LLMs 108.

Figure 4:
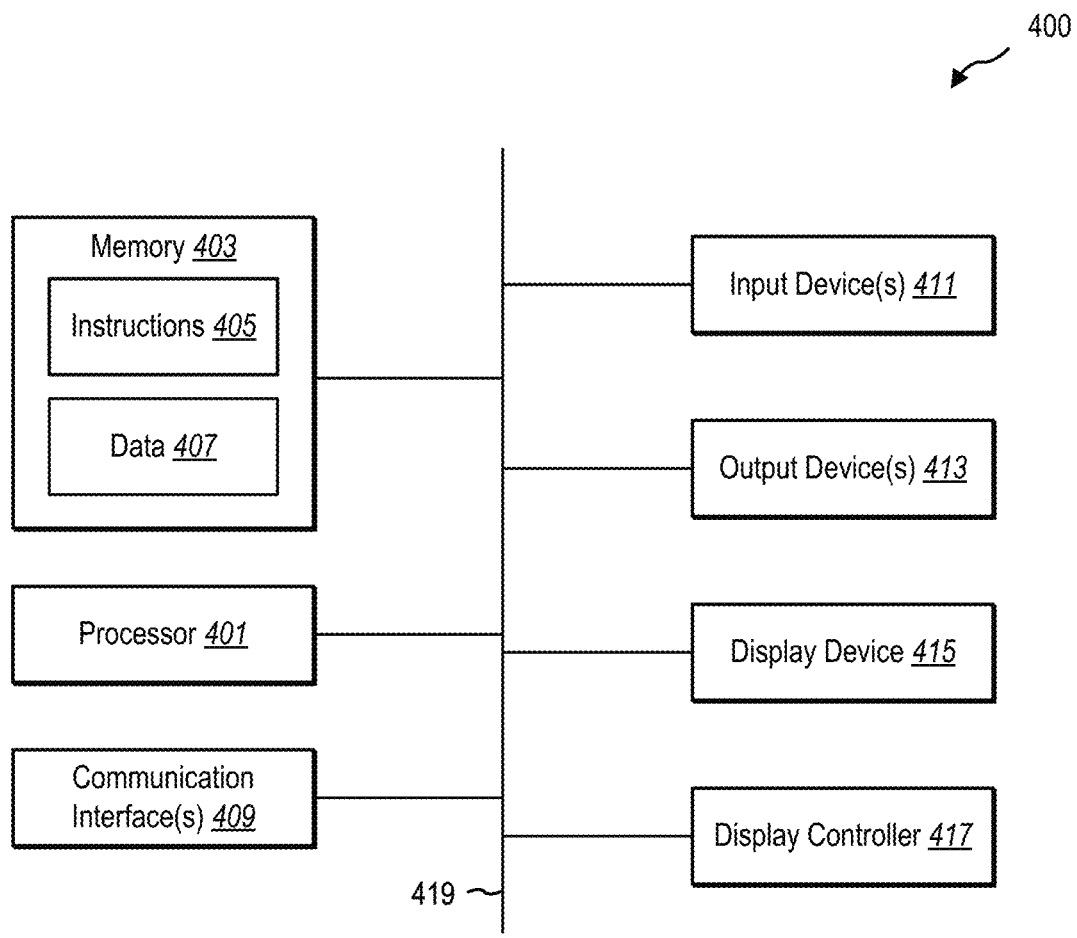
FIG. 4 illustrates components that may be included within a computer system.

FIG. 4 illustrates components that may be included within a computer system 400. One or more computer systems 400 may be used to implement the various methods, devices, components, and/or systems described herein.

The computer system 400 includes a processor 401. The processor 401 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 401 may be referred to as a central processing unit (CPU). Although just a single processor 401 is shown in the computer system 400 of FIG. 4, in an alternative configuration, a combination of processors (e.g., an ARM and DSP) could be used.

The computer system 400 also includes memory 403 in electronic communication with the processor 401. The memory 403 may be any electronic component capable of storing electronic information. For example, the memory 403 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 405 and data 407 may be stored in the memory 403. The instructions 405 may be executable by the processor 401 to implement some or all of the functionality disclosed herein. Executing the instructions 405 may involve the use of the data 407 that is stored in the memory 403. Any of the various examples of modules and components described herein may be implemented, partially or wholly, as instructions 405 stored in memory 403 and executed by the processor 401. Any of the various examples of data described herein may be among the data 407 that is stored in memory 403 and used during execution of the instructions 405 by the processor 401.

A computer system 400 may also include one or more communication interfaces 409 for communicating with other electronic devices. The communication interface(s) 409 may be based on wired communication technology, wireless communication technology, or both. Some examples of communication interfaces 409 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 400 may also include one or more input devices 411 and one or more output devices 413. Some examples of input devices 411 include a keyboard, mouse, microphone, remote control device, button, joystick, trackball, touchpad, and lightpen. Some examples of output devices 413 include a speaker and a printer. One specific type of output device that is typically included in a computer system 400 is a display device 415. Display devices 415 used with embodiments disclosed herein may utilize any suitable image projection technology, such as liquid crystal display (LCD), light-emitting diode (LED), gas plasma, electroluminescence, or the like. A display controller 417 may also be provided, for converting data 407 stored in the memory 403 into text, graphics, and/or moving images (as appropriate) shown on the display device 415.

In some implementations, the various components of the computer system 400 are implemented as one device. For example, the various components of the computer system 400 are implemented in a mobile phone or tablet. Another example includes the various components of the computer system 400 implemented in a personal computer.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a clustering model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   providing, to a plurality of users, access to a chat session that uses a plurality of large language models to provide responses to input messages received for the chat session;
   receiving changes to the chat session;
   updating the chat session in response to the changes to the chat session, wherein the plurality of large language models use the changes to the chat session in responding to subsequent input messages received for the chat session; and
   storing the changes to the chat session in a chat session history, wherein the chat session history maintains a state of the chat session that includes exchanges between the plurality of users and pages created for the chat session and the plurality of large language models use the chat session history in preparing subsequent responses to subsequent input messages.

2. The method of claim 1, wherein the pages correspond to input messages received in the chat session from any of the plurality of users and responses to the input messages provided by the plurality of large language models, and
   wherein the changes include modifications to the pages in the chat history.

3. The method of claim 1, wherein the responses received from the plurality of large language models include a plan with steps for responding to an input message and the changes to the chat session include modifications to the plan.

4. The method of claim 1, further comprising:
   resuming the chat session at a future time using the chat session history.

5. The method of claim 1, wherein the changes include an input message provided to the large language model from a user of the plurality of users and the chat session is updated to include the input message and a response from the plurality of large language models to the input message.

6. The method of claim 1, wherein the changes include an input message provided to the plurality of large language models from two or more users of the plurality of users and the chat session is updated to include the input message and a response from the plurality of large language models to the input message.

7. The method of claim 1, wherein the changes include:
   a first input message provided to the plurality of large language models from a first user of the plurality of users and the chat session is updated to include the first input message and a first response from the plurality of large language models to the first input message; and
   a second input message provided to the plurality of large language models from a second user of the plurality of users and the chat session is updated to include the second input message and a second response from the plurality of large language models to the second input message.

8. The method of claim 1, wherein the changes include a modification to a previous input message or response in the chat session.

9. The method of claim 1, wherein each user of the plurality of users accesses the chat session from a different device and the chat session is displayed on a user interface of each device.

10. The method of claim 1, wherein the plurality of users access the chat session at a same time.

11. The method of claim 1, wherein the plurality of users access the chat session at different times to make changes to the chat session.

12. The method of claim 1, wherein the plurality of large language models:
    retrieve relevant data from a grounded dataset for answering an input message for the chat session; and
    output a response with the relevant data with reference links identifying a source of the relevant data and a summary with reasoning on how the relevant data leads to conclusions in the response.

13. A device, comprising:
    a memory to store data and instructions; and
    a processor operable to communicate with the memory, wherein the processor is operable to:
    provide, to a plurality of users, access to a chat session that uses a plurality of large language models to provide responses to input messages received for the chat session;
    receive changes to the chat session;
    update the chat session in response to the changes to the chat session, wherein the plurality of large language models use the changes to the chat session in responding to subsequent input messages received for the chat session; and store the changes to the chat session in a chat session history with pages that correspond to input messages received in the chat session from any of the plurality of users and responses to the input messages provided by the plurality of large language models, wherein the plurality of large language models use the chat session history in preparing subsequent responses to subsequent input messages.

14. The device of claim 13, wherein the processor is further operable to:

resume the chat session at a future time using the chat session history.

15. The device of claim 13, wherein the plurality of users access the chat session at different times to make changes to a chat session history.

16. The device of claim 13, wherein the changes include:

a first input message provided to the plurality of large language models from a first user of the plurality of users and the chat session is updated to include the first input message and a first response from the plurality of large language models to the first input message; and a second input message provided to the large language model from a second user of the plurality of users and the chat session is updated to include the second input message and a second response from the plurality of large language models to the second input message.

17. The device of claim 13, wherein the plurality of users accesses the chat session from different devices at a same time.

* * * * *